United States Patent [19]

Brady et al.

[11] Patent Number: 5,638,773

[45] Date of Patent: Jun. 17, 1997

[54] METHOD AND APPARATUS FOR LOW NOX COMBUSTION OF GASEOUS FUELS

[75] Inventors: Robert T. Brady, Elmhurst; Dean C. Townsend, Northbrook, both of Ill.; George A. Weller, Blainville, Canada; Joseph H. Werling, Mundelein, Ill.

[73] Assignee: Mark IV Transportation Products Corp., Niles, Ill.

[21] Appl. No.: 503,581

[22] Filed: Jul. 17, 1995

Related U.S. Application Data

[63] Continuation of Ser. No. 105,094, Aug. 10, 1993, Pat. No. 5,433,174, which is a continuation of Ser. No. 760,023, Sep. 11, 1991, Pat. No. 5,259,342.

[51] Int. Cl.$^6$ .................................................... F22B 37/10
[52] U.S. Cl. ............................................. 122/248; 122/367.1
[58] Field of Search ................................. 110/204, 205, 110/206, 207; 122/367.1, 248, 250 R, 235.22, 469

[56] References Cited

U.S. PATENT DOCUMENTS

| | | | |
|---|---|---|---|
| 3,236,211 | 2/1966 | Okaniwa | 122/250 R |
| 3,908,604 | 9/1975 | Vöcklinghaus | 122/250 R |
| 3,998,188 | 12/1976 | Priest et al. | 122/250 R |
| 5,040,470 | 8/1991 | Lofton et al. | 110/204 |
| 5,156,097 | 10/1992 | Booth et al. | 110/204 |

*Primary Examiner*—Noah P. Kamen
*Attorney, Agent, or Firm*—Francis J. Lidd

[57] ABSTRACT

A method and apparatus for low NOX combustion of natural gas in a compact steam boiler having output steam delivery controlled by predetermined outlet steam pressure. The compact boiler employs a small high heat release combustor discharging into a forced draft convective heat exchange section. In operation, the compact boiler is completely and automatically self-operating, employing flue gas recirculation (FGR) wherein the FGR is admitted into the burner combustion air through a valve controlled by boiler flue gas NOX content. A novel bell mouthed flue gas scoop is utilized in the boiler stack upstream of the NOX sensor. In an alternate combustion chamber design, a cylindrical water wall coil surrounds the combustion process, increasing boiler efficiency through the inherent large temperature difference between the coil and the combustion in process, along with reducing the combustion temperature and further reducing the NOX content of combustion products. A further variation in the combustion system utilizes a ceramic shield surrounding a natural gas burner as it fires into the compact combustion chamber. Primary and secondary combustion air are admitted to the combustion chamber through first stage combustion internal of the shell and second stage combustion occurring internal of the boiler combustion chamber.

2 Claims, 4 Drawing Sheets

METHOD AND APPARATUS FOR LOW NOX COMBUSTION OF GASEOUS FUELS

This is a continuation of application U.S. Ser. No. 08/105,094 filed on Aug. 10, 1993 now U.S. Pat. No. 5,433,174, (which is a continuation of U.S. Ser. No. 07/760023, filed Sep. 11, 1991 now U.S. Pat. No. 5,259,342).

SPECIFICATION +ps To Whom It May Concern:

Be it known that we, Robert T. Brady, a citizen of the United States of America; Dean C. Townsend, a citizen of the Country of Canada; George A. Weller, a citizen of the the Country of Canada; and Joseph Werling, a citizen of the United States of America, residing at Elmhurst, County of DuPage, State of Illinois; Northbrook, County of Cook, State of Illinois; Ste. Therese, Quebec, Canada; and Mundelein, County of Cook, State of Illinois, have invented certain new and useful METHOD AND APPARATUS FOR LOW NOX COMBUSTION OF GASEOUS FUELS, of which the following is a specification.

BACKGROUND OF THE INVENTION

This invention relates primarily to low NOX combustion of gaseous fuels and more particularly concerns combustion in compact boilers and liquid phase heaters employing flue gas recirculation (FGR). Apparatus and methods disclosed in this application employ improved methods of recovering and controlling boiler stack flue gas and use of novel combustion chamber designs to reduce NOX produced in the combustion process.

In a preferred embodiment, the invention disclosed herein is utilized in a compact boiler.

Compact boilers are typified by heat release per cubic foot of boiler occupancy or unit space required for installation of several orders of magnitude greater than conventional boilers such as Scotch Marine or D frame designs. Compact boilers necessarily employ small combustion chambers demonstrating high heat release in the order of 500,000 BTU's per cubic foot of combustion volume. Although providing economical and space conserving boilers and fluid heaters, the compact designs result in inherently high temperatures generated in high heat release combustion system demonstrating percentages of NOX in combustion gases as high as 2000 parts/million (Volume, DRY).

Recent governmental regulations arising from air quality laws have drastically reduced the amount of allowable NOX in boiler flue gas which can be vented to the atmosphere. Therefore, many designs employing various techniques to reduce NOX are currently in use, including flue gas recirculation and so-called staged combustion to lower combustion temperatures and thereby hold NOX emissions in the stack gas to a predetermined level.

A typical compact boiler is disclosed and claimed in U.S. Pat. Nos. 2,735,410, 3,226,038 and 3,282,257 incorporated by reference herein. As disclosed in these references, the compact boiler is fully automatic in its operation and provides steam or heated fluids to widely fluctuating thermal loads. Compact boiler control may be of the type disclosed in U.S. Pat. No. 2,735,410, incorporated by reference above, or a similar method including programmed start-up and firing rates proportional to steam and/or heated liquid delivery rates. The fully automatic load range variation can result in "turn down ratios", i.e. the ratio of fuel admission over the boiler operating load range, as high as 600%.

Compact boilers have been in use for many years and demonstrate good operating records, however, in order to legally operate units of this type, it is necessary to reduce the NOX emissions.

Low NOX burners using flue gas recirculation (FGR) are old in the art and include the following U.S. patents:

Pat. No. 4,995,807
Pat. No. 5,002,484
Pat. No. 4,162,140
Pat. No. 4,776,320

While these systems can be effective in reducing NOX, the concepts and structures disclosed cannot be used in boilers of the compact type since the systems disclosed in these references are utilized in large capacity, large volume boilers operating at essentially constant firing rates. These designs, therefore, do not address the difficulties encountered in applying flue gas recirculation to a compact unit having a 600% variation in fuel rate.

Therefore, it is an object of this invention to provide a low NOX boiler using novel flue gas stack recovery method.

It is an additional object of this invention to provide a burner for a compact boiler wherein NOX concentration in boiler flue gas controls flue gas and combustion air mixing, thereby limiting the NOX content of combustion gases emitted to the atmosphere to a predetermined value over a 600% variation in boiler fuel rate.

It is yet an additional object of this invention to provide apparatus for controlling the NOX content of flue gas emitted to the atmosphere from a compact boiler through utilization of flue gas recirculation and a water wall combustion chamber.

It is yet an additional object of this invention to provide a low NOX combustor for a compact boiler utilizing a staged air burner in a water wall combustion chamber.

Further objects and advantages of the present invention will become apparent as the description proceeds and the features of novelty which characterize the invention will become apparent those skilled in the art.

SUMMARY OF THE INVENTION

In accordance with the invention, there is disclosed herein a compact boiler utilizing a high heat release combustion chamber (approximately 500,000 BTU's per cubic foot) utilizing forced air combustion and heat exchange to boiling or heated fluids. These units typically are automatic in operation having fuel to air ratios and fuel firing rates controlled entirely by the pressure of delivered steam or temperature of heated liquid supplied to the boiler thermal load. Applicants' discovery pertains to apparatus and control systems which limit the NOX content of emitted flue gases over the entire 600% fuel rate variation to acceptable levels.

The invention disclosed overcomes the difficulties encountered in systems in current use including inadequate flue gas recirculation at low firing rates which must necessarily be boosted through the use of auxiliary blowers. Applicants have discovered that a more cost effective method utilizes a novel bell mouthed scoop located in the boiler outlets stack. Use of the boilers combustion air blower to provide forced flue gas recirculation is a cost effective means and eliminates the use of an auxiliary blower.

Further, applicants have discovered the use of an intermediate ambient air admission control valve operated by the NOX concentration in combustion gases downstream of the flue gas recovery scoop provides a system in keeping with the self-operating concepts of the compact boiler over its entire operating range.

In an alternate embodiment, applicants have discovered that use of a water wall combustion chamber typically consisting of helically wound fluid carrying tubing surrounding the combustion process. This configuration further reduces NOX production in the combustion process through a reduction in temperature of the combustion process. This technique also provides improved boiler efficiency through circulating entering or low temperature boiler feed water or fluid to be heated through the water wall. Under these conditions, those skilled in the art will readily understand that this arrangement provides for a maximum temperature difference between the combustion process and the entering fluid.

A second alternate embodiment disclosed herein is a novel adaptation of staged combustion to compact boiler designs. As disclosed, it has been discovered that surrounding a gaseous burner with a refractory shell, properly positioned within the boiler combustion chamber, further reduces NOX concentration of the exhaust flue gas.

Therefore, it is an object of this invention to provide NOX emission control for an automatically operated pre-programmed start-up compact boiler utilizing flue gas recirculation.

It is a further object of this program to provide a flue gas recirculating system for an automatically operated compact boiler providing NOX control through modulation of combustion air input.

It is yet an additional object of this invention to provide a flue gas recirculating system for control of NOX emissions in a compact boiler utilizing capture of stack gas by a bell mouthed scoop.

It is a further object of this invention to provide a low NOX emitting combustion system for a compact automatic operating boiler gaseous fuel combustion temperatures are reduced by use of a water wall combustion chamber.

It is yet an additional object of this program to provide a low NOX combustion system for a compact boiler wherein a single combustion air blower captures boiler stack gases for recirculation through the boiler combustion chamber.

It is an additional object of this invention to provide a low NOX burner for a compact boiler providing reduced combustion temperatures through the use of staged combustion.

BRIEF DESCRIPTION OF THE DRAWINGS

Other objects and advantages of the combustion systems and flue gas recapture means disclosed herein will become apparent on reading the following detailed description and upon reference to the drawings in which.

DETAILED DESCRIPTION OF THE INVENTION

Figure 1:
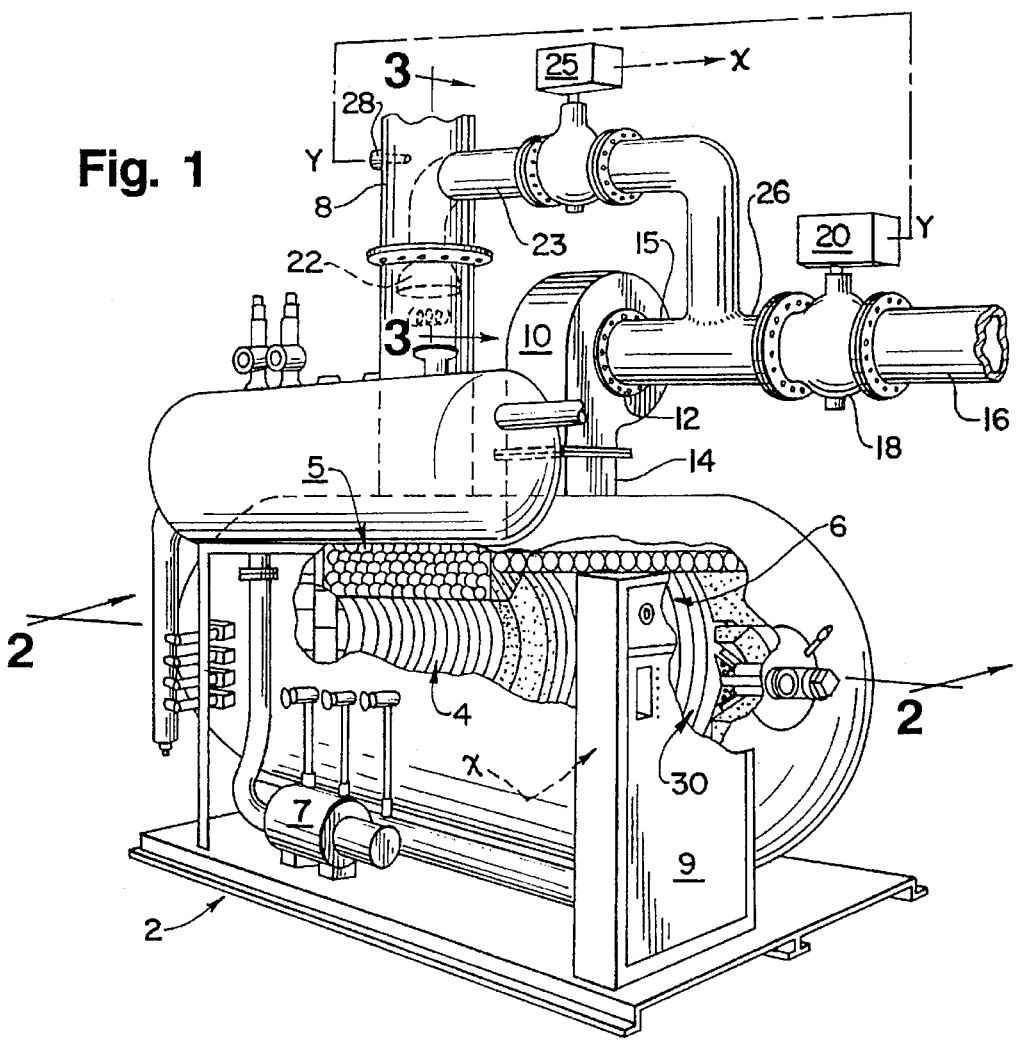
FIG. 1 is a semi-diagrammatical perspective drawing of the boiler and flue gas recirculation system of the invention, particularly showing, in cut-away, the combustion and heat exchange portions of the boiler.
Figure 2:
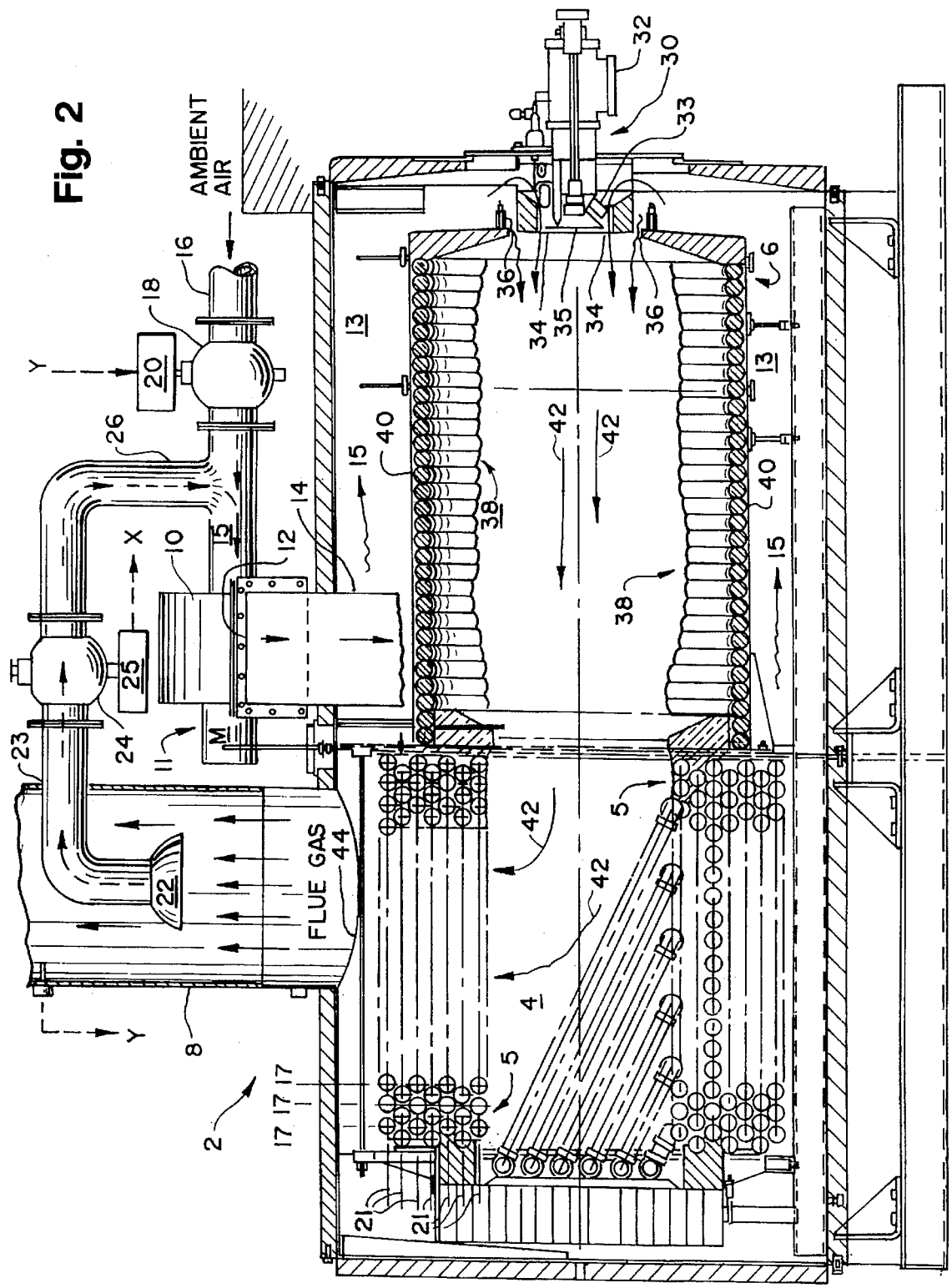
FIG. 2 is essentially a cross-section along the line 2—2 of FIG. 1, particularly showing a water wall combustion chamber and combustion air preheating plenum of a compact boiler.

In particular reference to FIGS. 1 and 2, there is shown a compact boiler assembly 2 having, at one end, a heat exchange assembly 4 comprising helically wound tubing coils 5, including a bank of coils 5 having a plurality of water tube coils, helically wound to typically provide a three row 17, seven layer 21 tube unit wherein each said row and layer are staggered with one another so that continuous gas paths are defined between the inner and outer diameters of the coil. Oppositely disposed to the heat exchange end 4 is a combustion end 6 having a burner assembly 30 for generating high temperature products of combustion.

Combustion products generated in the combustion end 6 enter the combustion chamber 38 and exit the heat exchange assembly end 4, pass through the sinuous gas paths of helical coil assembly 5 and enter the flue gas stack 8. Heat extracted from the combustion gases in passing through the water wall chamber 38 and the tubing coils 5 is used to produce steam or heat other liquids flowing through the aforementioned coil assemblies. The boiler assembly 2 further comprises a feed water pump 7 utilized to circulate the heated medium and/or produce steam. A control and instrument panel housing 9 containing program controllers, heated medium gauges and other operating equipment required to fully automate the compact boiler.

The combustion assembly 6 further includes a combustion air blower 10 driven by a drive motor 11. Combustion air comprising a mixture of recirculated flue gas and ambient air is forced into the combustion air plenum chamber 13 via the blower outlet 14. Combustion air passes through the plenum chamber 13 in the direction shown at 1S, passing over the outer surfaces of the combustion chamber assembly 40, further extracting heat from the water wall combustion chamber 38. It should be noted that the water wall combustion chamber 38 and combustion chamber plenum 13 are fluid isolated, one from the other.

In keeping with the invention disclosed herein, combustion ambient air enters the combustion air blower 10 at its inlet 12 via combustion air inlet duct 15. Similarly, ambient air enters the combustion air blower inlet via duct 16 passing through ambient air control valve 18. Control of ambient air in the disclosed flue gas recirculating system is an important aspect of the invention disclosed herein and will be treated in more detail.

Figure 3:
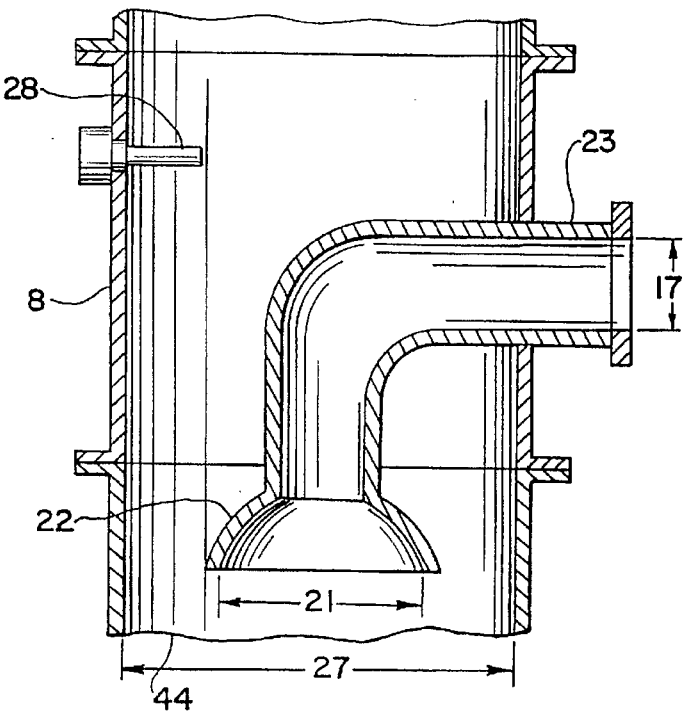
FIG. 3 is a partial cross-sectional view of the novel flue gas capture scoop of the invention along the line 3—3 of FIG. 1.

' Exhaust gases entering the exhaust gas stack 8 at the heat exchange outlet 44 are captured by a bell mouthed scoop 22 positioned as shown in FIG. 3 in the exhaust stack 8. Captured flue gas passes through flue gas stack duct 23 and shutoff valve 24 controlled by valve actuator 25, mixing with ambient air exiting ambient air valve 18 in a mixing tee 26.

It has been discovered that effective recirculation of exhaust gases is achieved by utilizing a bell mouthed scoop wherein the open or collecting area is approximately 20% of the exhaust stack cross-sectional area. For a typical 350 H.P. compact boiler, dimensions, 17, 21, and 27 would be 8 inches, 10 inches and 24 inches, respectively.

In keeping with an important aspect of the invention disclosed herein, a NOX sensor 28 is positioned in the boiler exhaust stack 8 downstream of the bell mouthed scoop 22. Valve actuator 20, controlling ambient air inlet valve 18, is responsive to NOX level signal supplied by sensor 28 and modulates incoming air so as to control the amount of NOX flowing into the ambient via exhaust stack means (not shown) in fluid communicating with duct 8. Those skilled in the fluid handling arts will readily see that the combination of sensor 28, valve 18 and combustion air blower 10 essentially provide control of the concentration of recirculated NOX entering the boiler combustor via the blower inlet 15 and exit without the need for an external or auxiliary flue gas blower. The configuration disclosed provides a novel and substantial advance in the art of flue gas recirculation.

Turning now to FIG. 2, at the combustion end 6 of the compact boiler 2 there is contained a burner assembly 30 comprising a gas inlet 32, having annular primary combustion air inlets 34 and secondary combustion air inlets 36 admitting combustion air in circumferential flow paths around the burner assembly 30. The burner assembly 30 has gaseous fluid admitting nozzles 33 and a flame spreading cone 35 (reference FIGS. 4 and 5). The entire burner assembly 30 is central and coaxial of the helically wound tubing 40 comprising the internal portion of the cylindrical water wall combustion chamber 38. Boiler feed water and/or heated fluid is pumped through the helically wound tubing 40, thereby absorbing heat and cooling combustion gases 42 flowing as shown, internal of the chamber 38.

Combustion air exiting the combustion air blower 10 at its outlet 14 passes through the above mentioned plenum 13 and flows as shown at 15 therein. Heated plenum combustion air enters the combustion chamber 38 via the aforementioned annular primary and secondary air inlets 34 and 36. Fuel gas enters the burner inlet 32 via a conventional piped or ducted system (not shown).

In operation, mixtures of combustion air and flue gas properly apportioned by a program control contained in cabinet 9 enter the combustion chamber 38 via annular ports 34 and 36, combining with gaseous fuel injected via nozzles 33 and diffused into the air entering via ports 34 by the spreading cone 35, are ignited by igniting means (not shown). High temperature combusting gases generated by the burner flow through the chamber 38 adjacent to the tubes 40, as shown at 42. After passing through the heat exchange coil assembly 5, the high temperature combustion products or flue gas enter the boiler exhaust stack 8 at interface 44. In flowing through the stack 8 a predetermined amount of flue gas is captured via the bell mouthed scoop 22, with the remainder exiting the exhaust end of stack 8 (not shown) to the atmosphere.

Captured flue gas flowing through duct 23 passes through shutoff valve 24 controlled by valve actuator 25. As valve 25 in this configuration is an additionally important aspect of the invention disclosed, further description will follow.

Captured flue gas passes through valve 24 and enters a mixing tee 26 where ambient air passing through valve 18 while mixed with flue gas at tee 26 enters duct section 15 and combustion blower inlet 10 for forced recirculation through the combustion plenum chamber 13. The pressurized combustion air of plenum chamber 13 is as described above, then recirculated through the burner assembly via annular ports 34 and 36.

Figure 6:
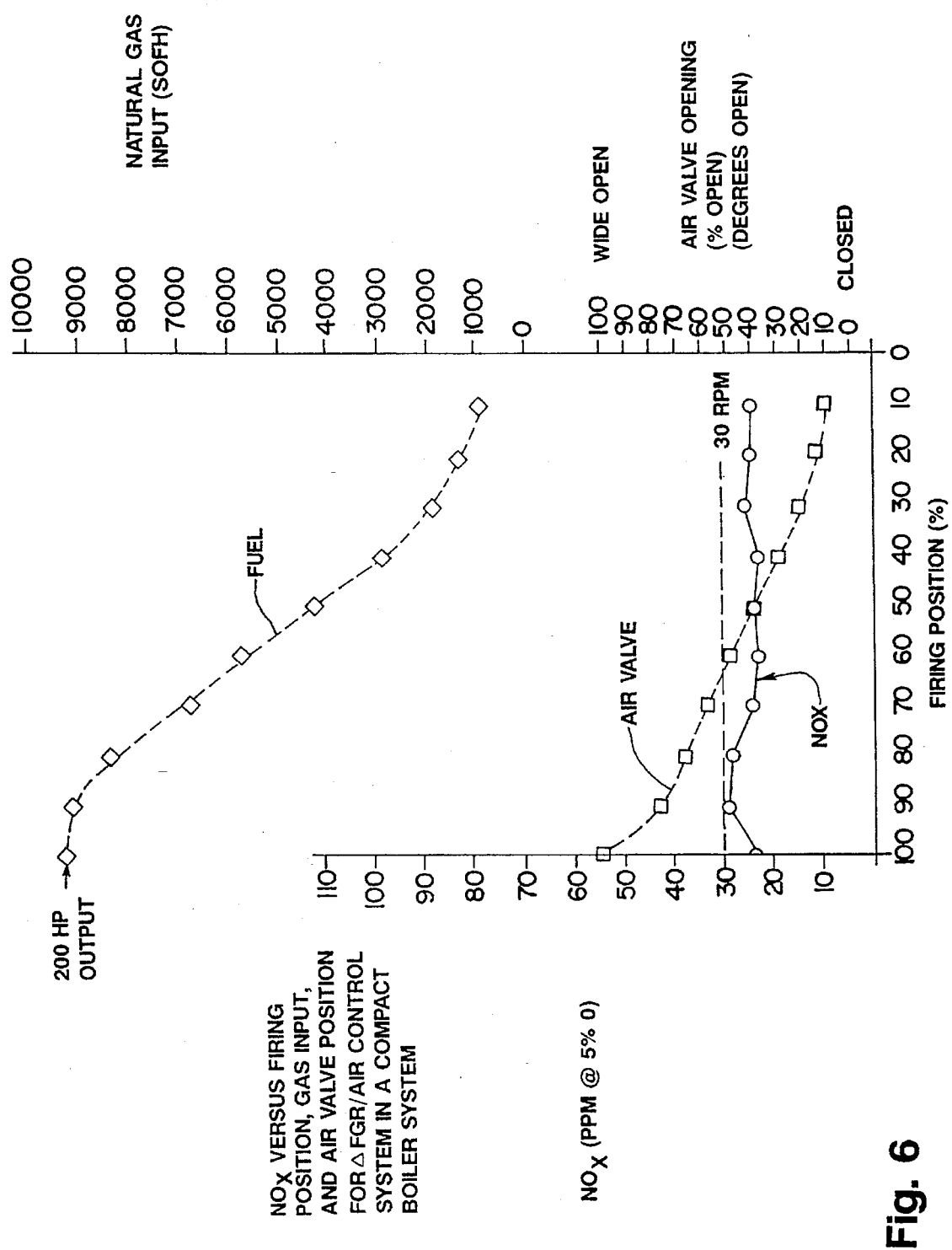
FIG. 6 shows performance results of the combustion system of the invention, particularly showing maintenance of a pre-determined level NOX in boiler stack emissions.

The NOX sensor 28 controls admission of ambient air via valve 18, thereby operating the boiler combustion system at a predetermined level of NOX. Results of operation with the system disclosed herein are shown on FIG. 6 wherein over a fuel rate ratio of one hundred-to-one, a predetermined NOX level has been achieved through control of combustion chamber temperatures through use of a water wall combustion chamber, and flue gas recirculation.

An additional aspect of the control system disclosed herein is use of a control shutoff valve 24 in the NOX recirculating duct 23. Those skilled in the compact boiler arts will understand that self-operating automatically controlled firing boilers such as disclosed herein employ a programmed start-up phase wherein the combustion and heat exchange sections of the boiler are purged or flow exhausted by combustion air prior to initiating combustion to insure start-up without previous fuel concentrations. Under these conditions, without the presence of valve 25, absence of NOX would essentially shut down the air valve thereby preventing the necessary purge of the boiler combustion system, resulting in terminating the entire start-up phase. In keeping with the invention disclosed herein, the automatic start-up cycle includes closing valve 24 through operation of controller 25 during the purge portion of the start-up cycle.

Figure 4:
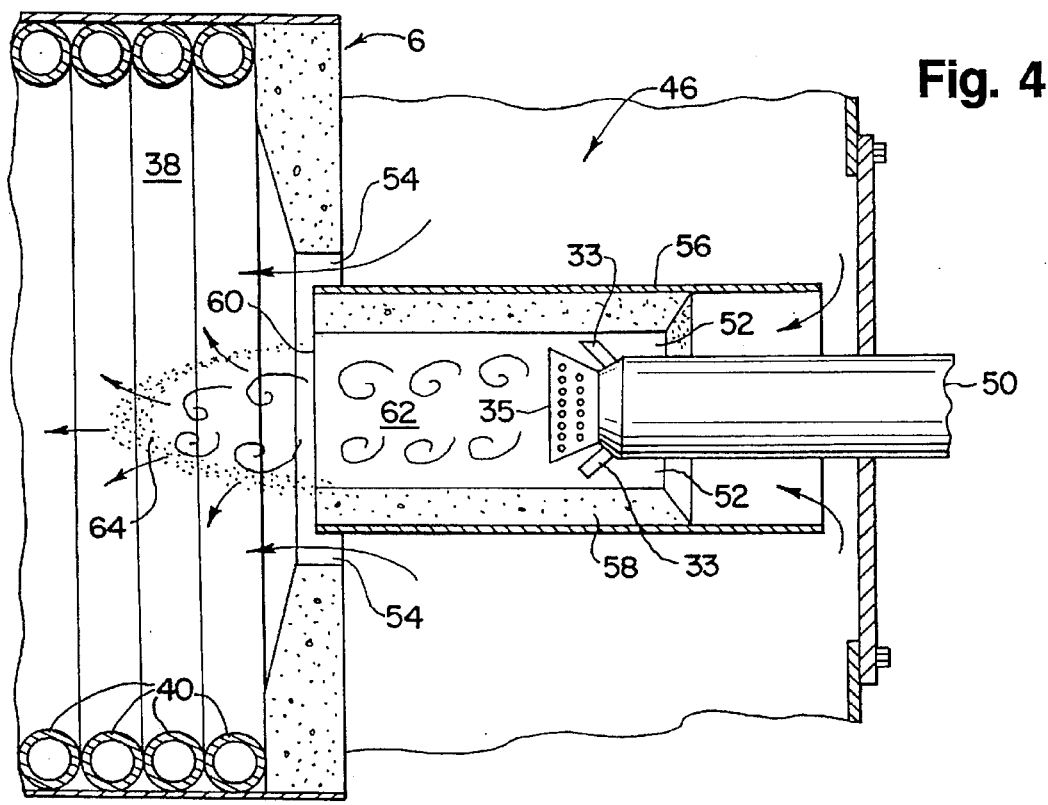
FIG. 4 is a cross-sectional view a portion of the combustion end of the compact boiler of the invention, particularly showing an alternate embodiment of the combustor of the invention utilizing staged combustion.
Figure 5:
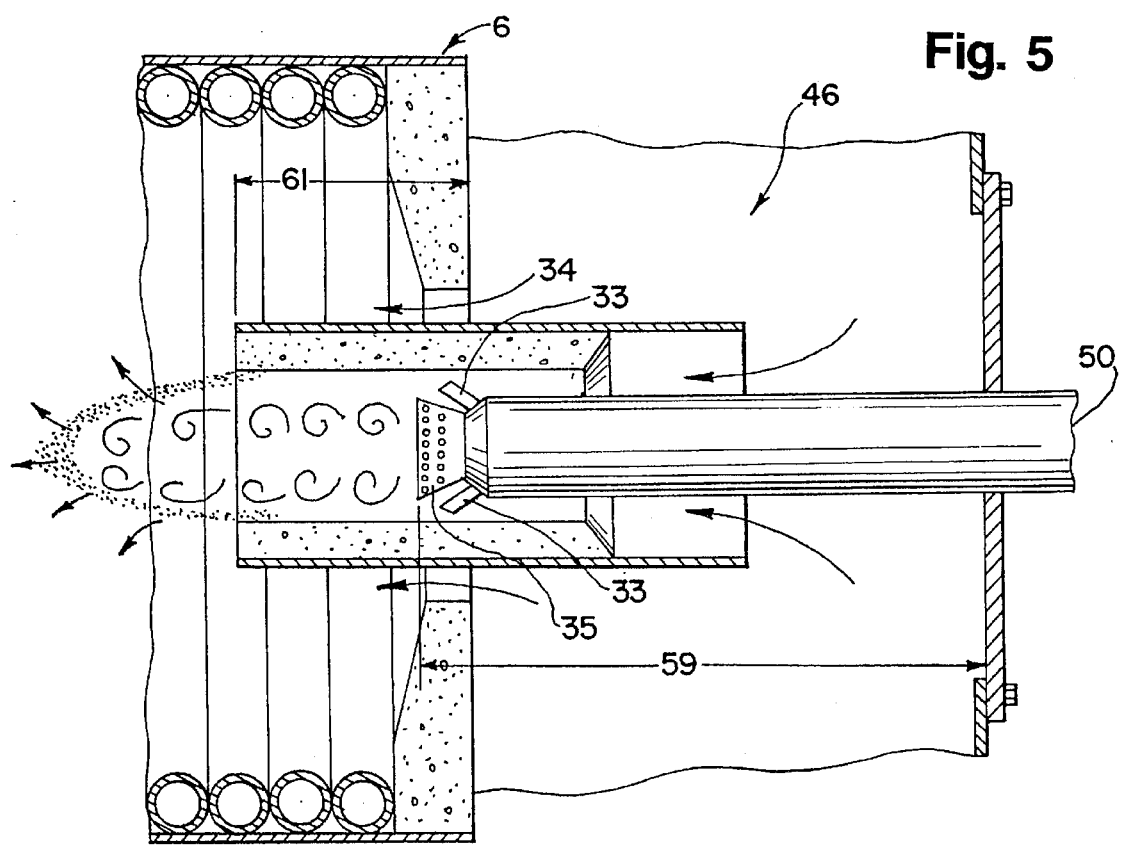
FIG. 5 is an additional cross-section similar to that of FIG. 4 showing the alternate embodiment burner of the invention in an alternate position internal of the water wall combustion chamber of the invention.

FIGS. 4 and 5 show an alternate embodiment of the burner system described above. In particular, with reference to FIG. 4, there is shown a combustor assembly 46 comprising an outer cylindrical shell 56 having an internal refractory liner 58. Coaxial with and internal of the liner 58 is the burner assembly utilized in the preferred embodiment as disclosed herein, consisting of the fuel gas inlet 50, fuel gas nozzles 33 and and perforated flame spreading cone 35. As in the preferred embodiment burner, annular primary and secondary combustion air inlets 52 and 54, respectively, are defined by the position of the burner assembly gas inlet 50 and burner outer shell 56, respectively.

With these constructions, combustion proceeds in several sequential stages, i.e., initially fuel rich in the area designated by 62, and on proceeding into the chamber in the combustion zone designated as 64 results in complete combustion of the fuel at lower temperatures with resulting lower NOX concentrations in the flue gas emission. Location of the burner inside the refractory tube and combustion end provide adjustments for controlling burner performance and size of the initial fuel rich area. Distances 59 and 61 have been found to vary from 7 inches to 9 inches for 59, and 9 inches to 11 inches for 61, respectively.

In operation, applicants have discovered that utilizing the alternate embodiment assembly positioned with a predetermined axial distance 59 between the burner assembly and the refractory liner exit 60 employing a further predetermined projection 60 of the refractory liner 56 internal of the water wall combustion chamber 38, results in a further reduction of NOX and flue gas emissions.

Thus, it is apparent that there has been provided in accordance with the invention, method and apparatus for low NOX combustion of gaseous fuels, that fully satisfy the objects, aims and advantages as set forth in the above description.

While the burner and NOX control system disclosed herein has been described in conjunction with specific embodiments thereof, it is evident that many alternatives, modifications, and variations will be apparent to those skilled in the art of flue gas recirculated combustion systems in the light of the foregoing description. Accordingly, it is intended to embrace all such alternatives, modifications, and variations as fall within the spirit and broad scope of the appended claims.

What is claimed as new and desired to be secured by Letters Patent of the United States is:

1. In combination, apparatus for limiting NOX content in flue gas emission from a compact boiler including a combustor containing a combustion process for generating heat and high temperature flue gas comprising:

a combustion chamber further comprising:
   an essentially cylindrical chamber wall formed by coiled tubing said tubing carrying boiler feed water for extracting heat from said combustion process and said flue gas, said chamber tubing coil having inlet and outlet ends; and,
   a heat exchanger comprising:
      a bank of coils having a plurality of water tube coils helically wound to provide rows and a layer of coils having an inlet and an inner coil diameter, and a coil outer diameter defined by an outer layer coil and a coil tubing outlet, and,
      means positioning each said coil row and layer such that adjacent turns of successive coil layers define sinuous gas flow paths extending through said inner and outer diameters of said coil; and,
      means coaxially mounting said heat exchange coil and combustion chamber, said heat exchanger coil inlet abutting said combustion chamber coil outlet end;
      means collecting said radially flowing flue gas;
      means circulating boiler feed water through said combustion chamber tubing coil, said feed water entering said coil inlet and exiting said outlet end; and,
      means fluid communicating said combustion chamber coil outlet and heat exchanger coil inlet, for conducting said combustion chamber feed water into and through said heat exchanger, for extracting heat from said flue gas; and, an exhaust stack in fluid communication with said flue gas collecting means;
   combustor means in said chamber inlet end for generating flue gas, further comprising:
      a burner in said combustor;
      gaseous fuel and combustion air inlet means in said burner; and, ambient air inlet means for supplying combustion air to said burner; valve means in said combustion air inlet intermediate said ambient air inlet and ambient air, for controlling combustion air flow therethrough;
         a duct projecting into said exhaust stack;
         an enlarged end on said stack projection for capturing flowing stack flue gas;
         valve means in said burner combustion air inlet for admitting said captured stack flue gas;
         wherein reduced combustion temperatures reduce flue gas NOX content.

2. In combination, apparatus for limiting NOX content in flue gas emission from a compact boiler, including a combustor containing a combustion process for generating combustion heat and high temperature flue gas comprising:
   a combustion chamber, further comprising;
      an essentially cylindrical chamber wall formed by a single layer coil of tubing, said tubing carrying boiler feed water for extracting heat from and lowering temperatures of said combustion process, said chamber having inlet and outlet ends; and,
   a burner in said chamber inlet end for initiating said combustion process; and,
   a heat exchange coil comprising:
      a bank of coils having a plurality of water tube coils helically wound to provide rows and layers of coils, having an inner coil diameter, and an, outer coil having a diameter defined by said outer coil row, said coil bank having a flue gas inlet defined by said inner row diameter; and,
      means staggering said helical coil layers such that the spacing between adjacent turns of successive coil layers defines a sinuous flue gas flow path through said inner and outer coil layers wherein flue gas exiting said combustion chamber outlet end flow into said flue gas inlet and through said coil layers; and,
      means coaxially mounting said heat exchange coil and said combustion chamber, said heat; exchange coil flue gas inlet abutting said combustion chamber outlet end;
      means circulating said boiler feed water sequentially through said combustion chamber coil and heat exchange coil, said feed water extracting heat from said combustion process and flowing flue gas, respectively, thereby reducing flue gas temperature;
   wherein NOX content of said combustor generated flue gas is reduced.

\* \* \* \* \*